UNITED STATES PATENT OFFICE.

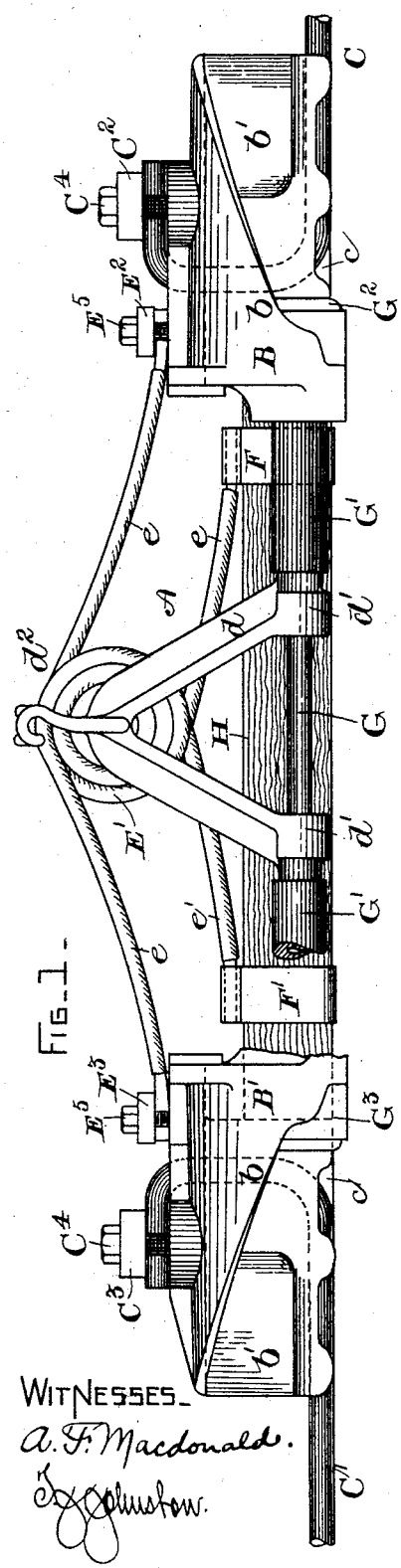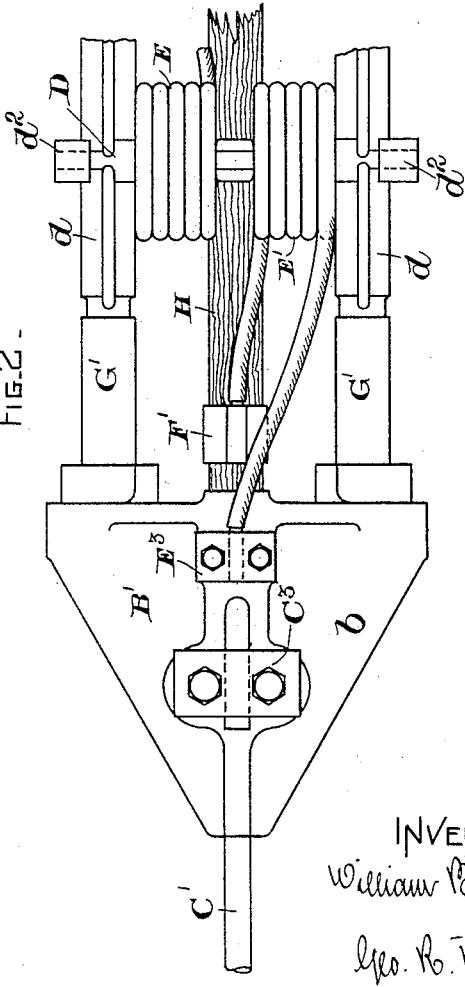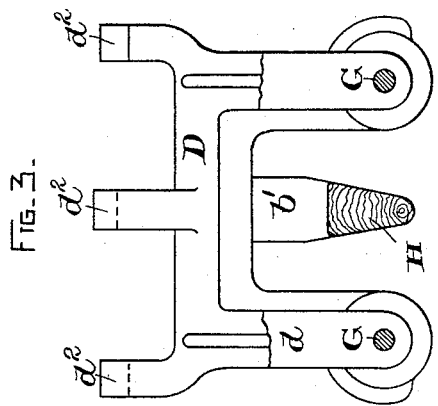

WILLIAM B. POTTER, OF SCHENECTADY, NEW YORK, ASSIGNOR TO THE GENERAL ELECTRIC COMPANY, OF BOSTON, MASSACHUSETTS.

TROLLEY-BREAKER.

SPECIFICATION forming part of Letters Patent No. 532,905, dated January 22, 1895.

Application filed August 4, 1894. Serial No. 519,471. (No model.)

*To all whom it may concern:*

Be it known that I, WILLIAM B. POTTER, a citizen of the United States, residing at Schenectady, in the county of Schenectady, State of New York, have invented certain new and useful Improvements in Trolley-Breakers, of which the following is a specification.

My invention relates to trolley breakers, as they are now commonly called in the art, meaning thereby a line section insulator for the different sections of the trolley line, designed to insulate the parts of the line from each other so as to permit the tapping in of separate feeders for each part of the line; and has for its object to provide a trolley breaker which shall be provided with a magnetic arc extinguisher by which it may be made shorter without affecting the insulation of the sections; to which ends I arrange my improved trolley breaker with three parallel rods lying side by side, the two outer rods being of iron or steel and connected by means of a yoke, upon which I arrange coils designed to energize the iron bars and thus form an electro-magnetic field which shall blow out any arc made by the trolley in passing across the insulator. I also improve the shape and configuration of the metallic end pieces of the trolley breaker, by which means I am enabled to prevent the trolley from catching, thereby preventing the risk of destruction of either the trolley wheel or trolley breaker.

The accompanying drawings show an embodiment of my invention.

Figure 1 is a side elevation, Fig. 2 a plan, part of the trolley breaker being broken away, and Fig. 3 an end elevation partly in section and with part broken away, of a trolley breaker constructed according to my invention.

A is the trolley breaker. B, B' are its metallic ends.

C, C' are the sections of the trolley wire. The two ends of the trolley wire are curved upward and passing through slots $c$ in the metallic ends of the trolley breaker, pass under the plates $C^2$, $C^3$ respectively and are secured in place by bolts $C^4$. As will be observed, the metallic end B is composed of a roof or watershedding portion $b$, and a vertical web $b'$, supporting the trolley wire. The edges of the roof or watershedding portion $b$ diverge from each other and are so arranged as to form a guide for the trolley, by which means if it should jump from the wire it will engage with one of these edges and be drawn away from the insulator in case the wheel itself is the portion which engages; while should the trolley pole strike, the trolley will be thrown to one side of the insulator and will not catch in it.

The side bars of iron are lettered G and only one of these is shown, it being in Fig. 1, and it being understood that there are two upon opposite sides of the bar H, which is formed of wood or other insulating material, and forms a track for the trolley in passing from one wire C to the other C' or vice versa. One end of these rods is upset and the other is provided with a bolt and nut, (not shown,) by which means the apparatus may be easily assembled. The head of one of the rods is shown at $G^2$ in the drawings, and they are surrounded at their ends with insulating sleeves, $G'$, $G'$, $G^3$ showing the insulation over the head of the bolt.

D is the yoke between the two bars G, G, composed of side arms $d$, $d$. A lug or boss $d'$ upon each of these arms is provided with a hole through the center through which the rod G passes making metallic contact with the yoke. Cross wire suspension is effected by means of the hooks $d^2$, $d^2$ seen best in Fig. 2.

Upon the bar H I provide insulated contacts F, F' and these contacts are connected with the metallic end pieces B, B' by the insulated cables $e$, $e'$ forming the coils E, E' around the cross piece of the yoke D. The direction of winding of the different coils depends upon the direction in which the current is supplied to the portion of the trolley line with which it is connected. They are so wound as to cause the magnetic field to blow the arc down and protect the bar H. The ends of the insulated cables or cords $e$, $e'$ are secured by the plates $E^2$, $E^3$ and by the bolts $E^5$ to the metallic end pieces B, B', though any other form of attachment preferred may be substituted for this one.

The rods G, G are composed of wrought iron or steel and form the main support for the trolley wires. The yoke D may be either of wrought or stamped iron, but is preferably of cast iron, as this is the cheapest construction and is abundantly strong for the purpose to which it is applied. In practice it takes but very little of the strain, which is borne by the rods G, G.

By the construction which I have described I get a light and strong trolley breaker the parts of which can be readily taken down and reassembled. At the same time its efficiency is greatly improved and I am enabled by it to separate by a comparatively short distance sections of line differing considerably in potential without danger of the trolley carrying across the arc and establishing a short circuit.

The action of the trolley in passing over my improved trolley breaker is as follows: Assuming that it passes from right to left in the drawings, it would run from the wire C to the runway H and as the wheel passes over the contact F the current would pass through the cables $e, e$ and around the yoke D, energizing the bars G and the arms $d$ and other parts of iron, forming a strong magnetic field which tends to break the spark following the trolley.

What I claim as new, and desire to secure by Letters Patent of the United States, is—

1. In a trolley breaker or line section insulator having parts formed of magnetic material, coils arranged upon such magnetic material, and means operated by the passage of the trolley adapted to pass the line current through such coils.

2. In a trolley breaker, a runway for the trolley composed of insulating material, magnetic material adjacent thereto, coils upon such magnetic material, and auxiliary contacts upon the runway, the coils being connected at one end to the trolley line and at the other to the auxiliary contact; whereby the passage of the trolley completes the circuit and energizes the magnetic material, thus forming a field of force acting to extinguish any arc following the trolley.

3. In a trolley breaker or line section insulator, a central bar adapted to form a runway for the trolley, side bars of magnetic material, end pieces connecting the bars but insulated therefrom, and a magnetic metallic yoke connecting the two outer bars together and having a winding thereon adapted to be supplied with current from the trolley wires upon the passage of the trolley.

4. In a trolley breaker or line section insulator, a central bar of insulating material forming a runway for the trolley, side bars of magnetic material, metallic end pieces connecting the bars together but insulated therefrom, an iron yoke connecting the outer magnectic bars together, coils upon the yoke connected at one end to the metallic end pieces of the trolley breaker and at the other end to the auxiliary terminals upon the insulating bars; whereby upon the passage of the trolley the current passes around the coil and energizes the yoke and the side bars to form a magnetic field adapted to blow out the arc following the trolley, substantially as set out herein.

5. As a new article of manufacture, a metallic end piece for a trolley breaker or line section insulator, having diverging edges adapted to guide the trolley away from the insulator when it jumps from the wire.

6. As a new article of manufacture, a metallic end piece for a trolley breaker or line section insulator, comprising a curved roof as $b$ and a vertical web portion as $b'$ to which the trolley wire is secured.

7. As a new article of manufacture, a metallic end piece for a trolley breaker or line section insulator, comprising a curved roof as $b$ and a vertical web as $b'$, the roof being provided with a slot as $c$ through which the trolley wire is passed to secure it in place.

8. As a new article of manufacture, a magnetic yoke piece D for a trolley breaker or line section insulator, comprising arms $d, d$, adapted to support the side rods, and hooks $d^2, d^2$ adapted to engage the span wire.

In witness whereof I have hereunto set my hand this 2d day of August, 1894.

WILLIAM B. POTTER.

Witnesses:
 B. B. HULL,
 A. F. MACDONALD.